Feb. 27, 1968  E. J. EISNER  3,370,662
FULL AND EMPTY INDICATING APPARATUS FOR BEAM SCALE
Filed Oct. 18, 1965  2 Sheets-Sheet 1

INVENTOR
Edwin J. Eisner
BY
Hovey, Schmidt, Johnson & Hovey
ATTORNEYS

Feb. 27, 1968   E. J. EISNER   3,370,662
FULL AND EMPTY INDICATING APPARATUS FOR BEAM SCALE
Filed Oct. 18, 1965   2 Sheets-Sheet 2
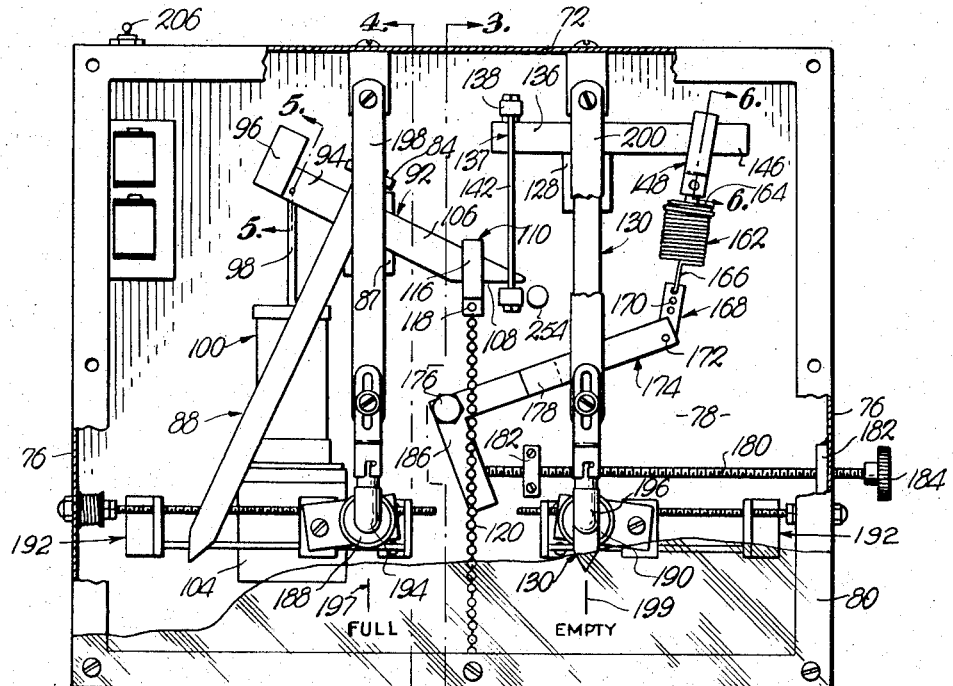
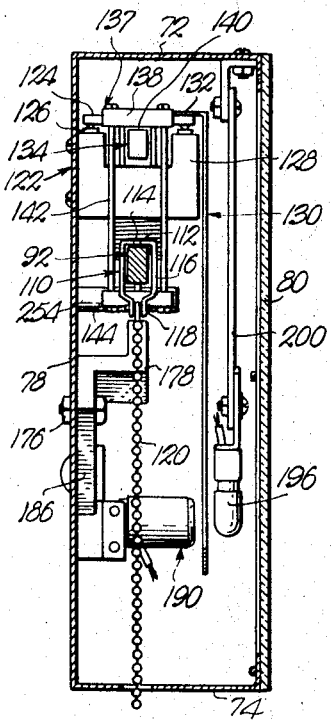
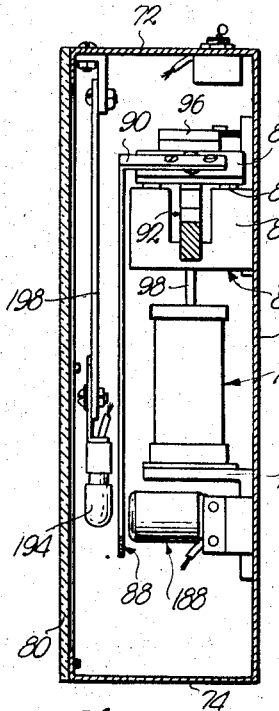
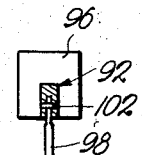
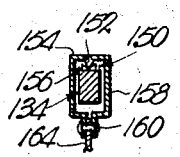
INVENTOR
Edwin J. Eisner
BY Hovey, Schmidt, Johnson & Hovey
ATTORNEYS

United States Patent Office 3,370,662
Patented Feb. 27, 1968

3,370,662
FULL AND EMPTY INDICATING APPARATUS FOR BEAM SCALE
Edwin J. Eisner, 6221 Morningside Drive, Kansas City, Mo. 64113
Filed Oct. 18, 1965, Ser. No. 497,209
8 Claims. (Cl. 177—60)

ABSTRACT OF THE DISCLOSURE

A load indicator for weighing continuously delivered accumulating material. A pivoting arm is coupled through a flexible element to the main scale beam and carries an indicator lever swingable with the arm to indicate the movement of the main scale beam. A second pivoted arm is coupled to the first arm and the indicator lever through linkage and to a swingable crank through a yieldable spring. One end of the crank is engaged by a frame mounted adjustment screw to vary the bias exerted by the spring on the arm carrying the adjustment screw. Material stopping means may be coupled with light-responsive electrical circuitry actuated by the lever to control the flow of material responsive to the movement of the indicating lever.

---

This invention relates to weighing apparatus and, more particularly, to a load indicator especially adapted for use in weighing continuously delivered accumulating material.

Conventional beam scale weighing apparatus generally includes a weight-receiving means which is equalized against counterbalance weight means or poises which are suitably positioned on the beam at a predetermined weight level. The beam swings through a range as material is added to the weight-receiving means and a certain point within the range, generally the horizontal position of the beam, indicates the proper load.

When material is delivered to the weight-receiving means in an accumulating manner, such as flowing grain, the balance point indicated by the beam is often difficult to detect and thus an excess amount of material may flow on the weight-receiving means before the delivery thereof is stopped. Time-consuming removal of the excess material is then required until the correct balance is indicated. Manifestly, if too much material is then removed, more delivery is required and it may thus take many tries to get the exact weight desired.

Heretofore, weight indicating dials have been utilized in an effort to more quickly and accurately detect the center balance point of the beam, but operator skill has still not been a sufficient means to normally obtain the correct weight on the first attempt. When the material being delivered to the weight-receiving means approaches full load, the beam will begin to swing in a continuous manner and thus the dial will exhibit a continuously progressing weight indication. It is virtually impossible to detect the exact weight desired and simultaneously stop delivery of the material because of the inherent, relatively fast movement of the beam. The cost of a dial unit is also often prohibitive.

Therefore, it is the primary object of my invention to provide a load indicator for a beam scale for weighing an accumulating material which is continuously delivered wherein the problems discussed above are overcome through the provision of novel, inexpensive indicating means which accurately detects a full load on the scale, and additionally, actuates means for stopping the flow of material when the precise desired weight has been delivered. Thus, the disadvantages of time-consuming cut-and-try methods previously employed are obviated.

An important object of the present invention is to provide a load indicator for a beam scale wherein the swinging of the beam is transferred in a multiplied manner to the novel indicating device, whereby the speed of the moving beam is substantially offset and the center balance point is thus more precisely detected.

A more particular object of the present invention is to provide a load indicator of the aforementioned character wherein the beam is coupled to a pivotal lever which swings through an arc substantially greater than that of the beam and, therefore, the exact center point is detectable within a relatively precise tolerance range to establish an accurate weighing technique. When the lever has swing to its full load indicating point, it will actuate suitable mechanism for stopping the flow of material.

Yet another object of the instant invention is to provide a load indicator as above described wherein an unloading means is incorporated in the mechanism and is actuated for use when a full load has been indicated and the delivery of material thereby stopped. Thus, a filling and emptying process is provided for quickly and accurately weighing batches of material.

It is an important aim of this invention to provide a load indicator for controlling the filling and emptying operations of a beam scale mechanism and additionally providing an empty indicator which cooperates with the load indicator to automatically reset the beam scale for use with the next batch of material after emptying is completed.

Another aim of this invention is to provide an indicator mechanism for a beam scale wherein cone pivot means are incorporated in the structure to reduce friction between the parts and thus assure optimum overall operation of the weighing apparatus.

Other objects include details of construction which will become apparent from the following specification and accompanying drawings, wherein:

FIG. 2 is an enlarged, front elevational view of the indicating apparatus, parts being broken away and in section to reveal details of construction;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 2; and

Figure 1:
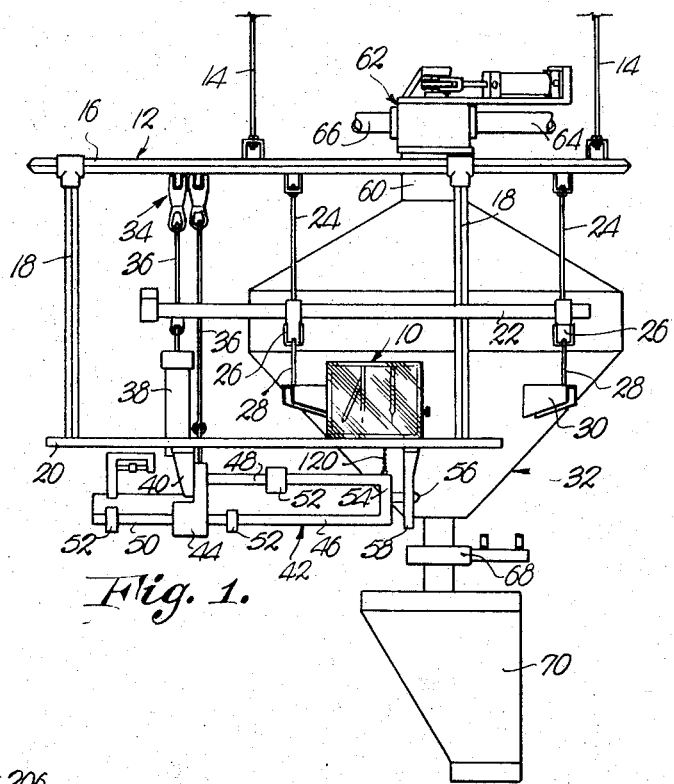
FIGURE 1 is is a fragmentary, front elevational view of a weighing mechanism utilizing an indicating apparatus made pursuant to the teachings of my invention.

The indicating apparatus of the present invention, broadly designated by the reference numeral 10, is adapted for use with beam scale balancing mechanism such as the type shown in FIG. 1 of the drawings. The beam scale balancing mechanism used for illustration is made pursuant to the principles disclosed in United States Letters Patent No. 3,174,568, issued to Edwin G. Eisner, on Mar. 23, 1965. The disclosures in the above patent are incorporated herein by reference and, therefore, it is not necessary to describe the assembly in detail.

It will suffice to say that there is a support 12 suspended by a plurality of rods 14 from, for example, the ceiling of a building. Support 12 includes a frame 16 having a pair of parallel stretches 18 depending therefrom and interconnected at the lowermost ends by a platform 20.

Indicating apparatus 10 is supported on the upper surface of platform 20.

A horizontal arm 22 is suspended from frame 16 by a pair of rods 24 through pivot connections 26. Each pivot connection 26 has a rod 28 depending thererfom which is connected to a respective leg 30 of a weight-receiving means or hopper 32. Hopper 32 is supported at the rear thereof by additional rods and legs (not shown).

A pivot beam 34 is carried by frame 16, the opposed ends thereof respectively connected by rods 36 to a take-up device 38 and arm 22. A mounting member 40 is secured to the lower surface of platform 20 and pivotally receives a beam 42 through a bracket 44. Rod 36, which is connected to arm 22, extends downwardly therefrom for connection to bracket 44.

Beam 42 includes beam sections 46, 48 and 50 which carry respective counterbalance weight means 52. An arm 54 interconnects the outer ends of sections 46 and 48 and a pointer 56 extends laterally from arm 54. An indicating bracket 58 extends downwardly from platform 20 and is adapted for receiving pointer 56 which may travel vertically therethrough.

The upper end of hopper 32 is provided with a hopper inlet 60 which is adapted to receive material flowing through a diverter valve 62 which includes an inlet tube 64 and an outlet tube 66. The lower end of hopper 32 is provided with a butterfly valve mechanism 68 which controls the unloading of hopper 32 into a receiving member 70. Thus, when material is delivered through diverter valve 62 into hopper 32, the latter will coact through pivot connectors 26, pivot beam 34, bracket 44 and beam 42 to indicate the weight of the incoming material. The precise operation of the assembly is fully described in the above-named patent.

Indicating apparatus 10 includes a metal box-like member having a top panel 72, a bottom panel 74, side panels 76, and a rear panel 78. The front of indicating apparatus 10 is covered by a pane of glass 80.

A U-shaped seat 82 is secured to rear panel 78 (FIG. 4) and is adapted to receive a rocking shaft 84 by means of a pair of cone pivots 86 positioned at the upper free ends of legs 87 of seat 82. A load indicator lever 88 depends from rocking shaft 84 and is connected thereto by a laterally extending leg 90. An elongated pivot arm 92 is rigidly secured intermediate its ends to the lower surface of rocking shaft 84 and is positioned to travel within the opening between legs 87 of seat 82. Arm 92 is in perpendicular relationship to load indicator lever 88. One end 94 of arm 92 receives a counterweight 96 and is pivotally connected to a shaft 98 of a dashpot 100 by means of a pin 102 (FIG. 5). Dashpot 100 is supported by an L-shaped support bracket 104 mounted on rear panel 78 (FIG. 4).

The opposite end 106 of arm 92 has a tapered lower surface 108 and the upper surface thereof is adapted to carry a U-shaped bracket 110 which straddles arm 92 and is supported thereon by cone pivot means 112 which engages the bight 114 of bracket 110. The free ends of legs 116 of bracket 110 are directed inwardly and joined by a pin 118 which carries a chain 120 (FIG. 3). Chain 120 extends downwardly through bottom panel 74 and is linked to beam 42 at the juncture of beam section 48 and arm 54.

A second U-shaped seat 122 is mounted on rear panel 78 in spaced relationship to U-shaped seat 82 and is adapted to carry a rocking shaft 124 which is supported thereon by a pair of cone pivots 126 positioned on the upper surface of respective legs 128 of seat 122 (FIG. 3). An empty indicator lever 130 depends from rocking shaft 124 and is connected thereto by a laterally extending leg 132. A pivot bar 134 is connected intermediate its ends to the lower surface of rocking shaft 124 and is positioned to travel between legs 128. Pivot bar 134 is in perpendicular relationship to empty indicator lever 130.

One end 136 of pivot bar 134 carries a transfer guide 137 which includes a bar 138 supported on the upper surface of bar 134 through a cone pivot 140. A pair of spaced, opposed guide rods 142 extend downwardly from bar 138 and are joined at their lower ends by a bar 144. As will be noted in FIG. 2, end 106 of arm 92 is positioned to travel between rods 142.

The opposite end 146 of pivot bar 134 carries a U-shaped bracket 148 by means of a cone pivot 150. As shown in FIG. 6, cone pivot 150 comprises a cone element 152 secured to the lower surface of bight 154 of bracket 148, the apex end of cone element 152 being received by a concave bearing surface 156 mounted on the upper surface of pivot bar 134. The other cone pivots used in the present device may be constructed in substantially the same manner as pivot 150. Legs 158 of bracket 148 straddle pivot bar 134 and extend inwardly at the free ends thereof to be joined by a pin 160.

A coil spring 162 has one end 164 thereof secured to pin 160, the opposite end 166 being connected to a pivot bracket 168 having a plurality of adjustment holes 170. Bracket 168 is pivotally connected by a pin 172 which is journalled into one of the holes 170 to an L-shaped crank 174 which is pivotally mounted at the apex thereof to rear panel 78 by a shaft 176.

Leg 178 of crank 174 is substantially Z-shaped in configuration, whereby the free end thereof is spaced from rear wall 78 and positioned to be connected with bracket 168. A screw shaft 180 extends horizontally through one of the side panels 76 and is supported within indicating apparatus 10 by a pair of threaded spacers 182 mounted on rear panel 78. A knob 184 is mounted on the outer end of shaft 180, while the inner end thereof is positioned to engage the outer portion of leg 186 of crank 174 (FIG. 2).

Indicator levers 88 and 130 are provided with light dependent resistors 188 and 190 respectively which are mounted by brackets 192 on rear panel 78 and side panels 76. Resistors 188 and 190 are provided with spaced electric lamps 194 and 196, respectively, which are suspended from top panel 72 by brackets 198 and 200. Levers 88 and 130 are positioned to swing between their respective resistors and lamps and are aligned therewith when the levers are disposed in a vertical position with the true vertical being indicated by the alignment of the pointed ends of levers 88 and 130 with respective load and empty marks 197 and 199 which are formed in glass pane 80.

Figure 7:
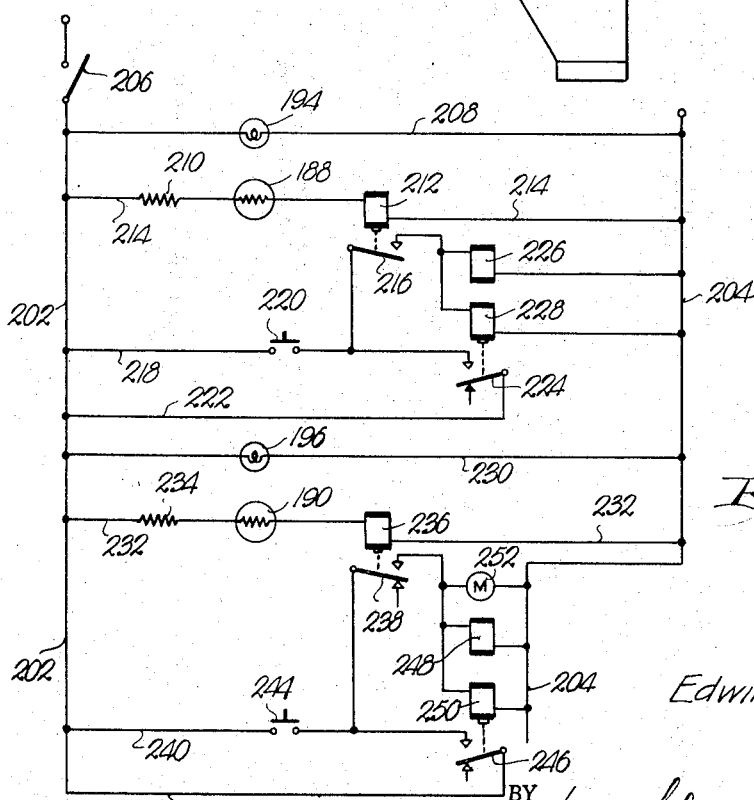
FIG. 7 is a schematic wiring diagram of an electrical circuit for use with the weighing mechanism shown in FIG. 1.

An illustrative electrical circuit of my invention is shown in FIG. 7 and includes a conventional 110 volt circuit comprising AC lines 202 and 204, there being a switch 206 for selectively energizing the circuit. Switch 206 is shown mounted on top panel 72 in FIG. 2.

Lamp 194 is connected across lines 202 and 204 by a line 208, and its associated light dependent resistor 188 is disposed to receive the beam of light from lamp 194 as shown in FIG. 4. Resistor 188 is series connected with a resistance 210 and a relay coil 212 through a line 214 which connects lines 202 and 204. Coil 212 is operably associated with a normally open relay switch 216 shown in its normal de-energized position. A lead 218 connects line 202 and relay switch 216 through a push-button switch 220. An alternate connection between line 202 and relay switch 216 is provided through a lead 222, normally open relay switch 224, and lead 218. A solenoid 226 for operation of diverter valve 62 and a relay coil 228 are connected between relay switch 216 and line 204, coil 228 being provided for operation of switch 224.

Lamp 196 is connected between lines 202 and 204 by a line 230 and is disposed as shown in FIG. 3 for directing a beam of light toward light dependent resistor 190 which is series connected in line 232 with a resistance 234 and a relay coil 236. A normally open relay switch 238, leads 240 and 242, push button 244, normally open relay switch 246, solenoid 248 for butterfly valve 68, and relay coil 250 are associated with relay coil 236 in the identical manner discussed above with respect to relay coil 212. In addition, a vibrator motor 252 is connected in parallel with solenoid 248 and relay coil 250.

In operation, assuming that hopper 32 is empty, beam 42 is initially disposed horizontally with pointer 56 indicating the center balance point. When beam 42 is horizontal, load indicator lever 88 is disposed vertically between resistor 188 and lamp 194 by its interconnection to beam 42 through chain 120 and pivot arm 92. The balance is indicated by the alignment of the pointed end of lever 88 with "full" load mark 197.

Counterbalance weight means or poises 52 are moved along respective beam sections 46, 48 and 50 to the desired weight which is to be delivered to hopper 32. Movement of weight means 52 will cause beam 42 to swing downwardly with pointer 56 swinging through indicating bracket 58. This action causes a corresponding lowering of chain 120 and end 106 of arm 92 to swing load indicator lever 88 clockwise about cone pivots 86 to approximately the position shown in FIG. 2.

When pointer 56 of beam 42 is in its lowermost position within bracket 58, transfer guide 137 is drawn downwardly to dispose empty indicator lever 130 slightly counterclockwise from its vertical position between resistor 190 and lamp 196. Lever 130 thus must be aligned with empty mark 199 and this is accomplished by turning knob 184 to force shaft 180 against leg 186 of crank 174 to shift the latter in a clockwise direction to cause a stretching of spring 162 and consequently lowering of end 146 of pivot bar 134. As end 146 is lowered, pivot bar 134 swings about cone pivots 126 to draw bar 144 upwardly against lower surface 108 of arm 92, and arms 92, guide 137, chain 120, and beam 42 rise as a unit to raise pointer 56 of beam 42 from the bottom of indicating bracket 58. The interconnection of parts is such that empty indicator lever 130 is aligned with empty mark 199 when pointer 56 is slightly raised from the bottom of bracket 58.

The above zeroing process is utilized when the weight set on beam 42 is higher than that compensated for by spring 162 and its cooperation with shaft 180. Conversely, if the weight set on beam 42 is relatively low with respect to the setting of shaft 180, spring 162 will tend to pivot bar 134 clockwise to raise transfer guide 137 and consequently, end 106 of arm 92 to give a corresponding raising of pointer 56 of beam 42 within bracket 58. The pivoting of bar 134 disposes empty indicator lever 130 slightly clockwise from its vertical position and alignment thereof is accomplished by turning knob 184 to longitudinally shift shaft 180 away from leg 186 of crank 174 to give a counterclockwise pivoting of the latter until bar 134 is in the horizontal position shown in FIG. 2. At this point, empty indicator lever 130 is brought into alignment with empty mark 199 and the indicating apparatus is properly zeroed in preparation for the weighing operation.

It will be appreciated that various weight values may be set on beam 42 and such weight differences will be compensated for by the biasing of spring 162. Greater changes in weight values may be accounted for by placing end 166 of spring 162 into alternate adjustment holes 170. After empty indicator lever 130 has been correctly zeroed with respect to empty mark 199, no further adjustments for subsequent weighings will be necessary as long as the same weight load in hopper 32 is desired.

To prepare the indicator apparatus 10 for weighing, switch 206 is closed to cause current to flow through lines 202 and 204 and thus energize lamps 194 and 196. Sufficient current will not flow through lines 214 and 232 to energize coils 212 and 236 because the resistances of respective resistors 188 and 190 are too high. However, since the resistances of resistors 188 and 190 are light dependent, if light from a respective lamp 194 or 196 is received by a corresponding resistor, the resistance thereof will be lowered to allow current flow through the corresponding line 214 or 232.

Initially, as shown in FIG. 2, lever 88 is not in its vertical position and, therefore, light from lamp 194 is received by resistor 188 to lower the resistance of the latter to permit energization of relay coil 212 to close switch 216. Empty indicator lever 130 is in its vertical position and thus resistor 190 does not receive light from lamp 196 and consequently there is no energization of coil 236.

To begin the filling operation, push button 220 is depressed and current will thus flow through lead 218 to the closed relay switch 216 and thence through solenoid 226 and relay coil 228. Since current is flowing through relay coil 228, the latter will be energized to close switch 224 whereby current will be caused to flow through lead 222 to switch 224 and thence through lead 218, switch 216, solenoid 226, and relay coil 228. Therefore, when push button 220 is released, current will continue to flow through solenoid 226 and relay coil 228 by the "hold" circuit set up through lead 222 and switch 224.

As current flows through solenoid 226, diverter valve 62 will be operated whereby an accumulating, continuously fed material, such as grain, will be delivered from a supply point to tube 64, and directed downwardly through hopper inlet 60 to fill hopper 32. It will be recognized that butterfly valve 68 is closed to prevent passage of the material therethrough since solenoid 248, which controls operation of the butterfly valve, is not presently actuated. When the weight of the incoming material approaches the preset full load weight, beam 42, through its interconnection with arm 22 and hopper 32, will begin to swing to raise pointer 56 upwardly in a continuous manner toward its horizontal center balance point. Simultaneously, chain 120 and end 106 of arm 92 will raise, permitting transfer guide 137 to move upwardly and thereby decrease the tension on spring 162 which permits the same to contract and pivot bar 134 clockwise, giving a corresponding clockwise movement to empty indicator lever 130 to swing the latter out of alignment with respect to lamp 196 and resistor 190. Light from lamp 196 will be received by resistor 190 to lower the resistance of the latter and thereby permit energization of relay coil 236 to close switch 238, but it will be appreciated that current will not flow through switch 238 until push button 244 has been depressed.

As empty indicator lever 130 is swung out of its vertical alignment, load indicator lever 88 will correspondingly swing in a continuous manner in a counterclockwise direction as the full load weight is approached and end 105 of arm 92 will be guided between rods 142. When the present weight of material has been delivered into hopper 32, pointer 56 reaches its horizontal center balance point position and lever 88 is in vertical alignment between lamp 194 and resistor 188. At this time, since resistor 188 is no longer receiving light from lamp 194, relay coil 212 will be de-energized and switch 216 will open to discontinue current flow through solenoid 226 and relay coil 228. The deactuation of solenoid 226 causes diverter valve 62 to operate to discontinue flow through inlet 60 and the material will alternately be delivered through outlet tube 66. The diverter valve 62 thus serves as a stopping means which is actuated by the light responsive circuitry to discontinue delivery of the material essentially simultaneously with the attainment of a precise weight balance as indicated by pointer 56.

Dashpot 100 connected to arm 92 acts as a snubber to prevent over-travel of the load indicator lever and thus the latter will be maintained in its vertical position. Smooth operation of indicating apparatus 10 will also be aided by placing a post 254 (FIGS. 2 and 3) adjacent bar 144 of transfer guide 137 to prevent rotation of the latter about cone pivot 140.

Hopper 32 is unloaded by depressing push button 244 to permit current flow through lead 240 to closed switch 238 and thence through motor 252, solenoid 248 and relay coil 250. Energization of relay coil 250 causes relay switch 246 to close and thereby set up a hold circuit for current flow through lead 242 to switch 246 and thence through lead 240 to switch 238. The latter current path will continue after push button 244 has been released.

Current flow through solenoid 248 causes the butterfly valve unloading means 68 to open whereby the accumulated material in hopper 32 will be emptied into receiving member 70. Motor 252 is coupled with hopper 32 to vibrate the latter to facilitate the emptying operation.

As hopper 32 is emptied, beam 42 will lower and thereby swing load indicator lever 88 in a clockwise direction to again permit light from lamp 194 to be directed on resistor 188. However, the filling operation will not commence until push button 220 is depressed.

As beam 42 lowers, end 106 of arm 92 will move downwardly between rods 142 of transfer guide 137 until lower surface 108 of arm 92 engages the upper surface of bar 144, and thereafter pivot bar 134 will swing until beam 42 has lowered to its initial zeroed setting, whereupon bar 134 will be disposed in its horizontal position and consequently, empty indicator lever 130 will be re-aligned between lamp 196 and resistor 190. Resistance of resistor 190 will then be raised whereby coil 236 will be de-energized, switch 238 will open and motor 252 and solenoid 248 will be deactuated to respectively stop vibration of hopper 32 and close butterfly valve 68 in preparation for the next filling operation. Thus, the light-responsive circuitry serves as arresting means to stop operation of valve 68 when empty indicator lever member 130 has shifted from a first operating position to the second operating position corresponding to the zeroed beam position. The indicating apparatus has thereby been automatically reset for the next weighing which will be commenced by depressing push button 220.

It is noteworthy that the arc travelled by that portion of the load indicator lever 88 which breaks the light as it swings from its first operating position shown in FIG. 2 to its second operating position in vertical alignment with lamp 194 and resistor 188, is substantially greater than the arc traversed by pointer 56 of beam 42 as it swings through a range from its zeroed lower position to the center full load balance point. As noted with respect to the prior art, the exact center point of the continuously moving beam is difficult to detect and thus, the greater range of swing of lever 88 increases the preciseness with which the balance point is indicated, resulting in a substantially greater sensitivity in my indicating device.

Another important feature of the invention is the cooperation between levers 88 and 130 through transfer guide 137 which gives joint operation of the full load and empty indicating procedures. Therefore, a novel, accurate indicating apparatus is provided which will advantageously control filling and emptying operations, with the weight of the loads being maintained within precise tolerances.

The use of cone pivots throughout the apparatus is highly advantageous as friction between the parts is greatly reduced. Also, cone pivots are easily replaced and are relatively inexpensive.

It will be recognized that various electrical circuits may be employed with my apparatus and an automatic operation could be arranged if desired. For example, a time delay mechanism co-ordinated with the material flow could be employed to obviate the need for two push buttons in the circuit.

Having thus described the invention, what is claimed as new and desired to be secured by Letters Patent is:

1. In a beam scale balancing mechanism having a weight-receiving means coupled to a weight responsive, pivotal beam scale swingable through a range having a "full" load balance point as material is delivered from a supply point and accumulated on the weight-receiving means, a "full" and "empty" indicating apparatus for said mechanism comprising:

a support;

a load indicator lever;

means pivotally mounting said load lever on said support;

structure intercoupling the beam and said load lever for swinging the latter from a first operating position to a second operating position as the beam swings through its range, said second operating position coresponding to the beam's "full" load balance point, said structure including a pivot arm rigidly mounted on said load lever and a link pivotally mounted on said arm is spaced relationship to said load lever, said link being coupled to said beam for movement therewith;

stopping means actuated by said load lever when the latter is in said second operating position for discontinuing delivery of the material from the supply point to the weight-receiving means; unloading means coupled to said lever for emptying said weight-receiving means and means for actuating said unloading means for the emptying operation after the delivery of material has been discontinued; and a shiftable "empty" indicating member and shifting means coupling said beam and member for shifting the latter from a first to a second operating position as said weight-receiving means is emptied by said unloading means to swing said beam through it range, said second operating position corresponding to the beam position when said weight-receiving means is empty, and arresting means actuated by said member when the latter has reached said second operating position for stopping operation of said unloading means unitl a full load of material has again been delivered to said weight-receiving means.

2. Apparatus as set forth in claim 1, wherein said shifting means includes a weight-responsive biasing element and a zeroing means for positioning said member in its second operative position prior to commencement of material delivery to said weight-receiving means, said biasing element compensating for variations in weight settings on said beam scale.

3. Apparatus as set forth in claim 1, wherein said zeroing means comprises a crank pivotally mounted intermediate its ends on said suport, one end of said crank being secured to said element and means engaging the opposite end of said crank for adjusting the position thereof and thereby varying the biasing of said element.

4. Apparatus as set forth in claim 1, wherein said shifting means and said structure are interconnected for joint operation in response to the movement of said beam.

5. Apparatus as set forth in claim 2, wherein said element comprises a lever pivotally mounted on said support in spaced relationship to said load indicator lever and said shifting means includes a pivot bar rigidly secured intermediate its ends to said lever, one end of said bar being coupled to said biasing element, the opposite end of the bar being coupled to said beam for movement therewith for swinging said lever.

6. Apparatus as set forth in claim 5, wherein said structure includes an elongated pivot arm rigidly secured to said load lever and said shifting means includes a transfer guide joining said opposite end of the bar and said arm, there being a link coupled between said arm and said beam so that when said beam swings through its range, said lever and member will cooperate through said guide to swing to their respective operating positions.

7. Apparatus as set forth in claim 4, wherein said stopping means and arresting means are each coupled for operation with light-responsive electrical circuitry actuated by said lever and member when the latter are in respective second operating positions.

8. In a beam scale mechanism having a weight-receiving means coupled to a weight-responsive, pivotal beam scale swingable through a range having a "full" load balance point as material is delivered from a supply point and accumulated on the weight-receiving means, a "full"

and "empty" indicating apparatus for said mechanism comprising:
- a support;
- a load indicator lever;
- means pivotally mounting said load lever on said support;
- an arm extending from said lever;
- a link interconnecting said beam and said arm for swinging the latter from a first operating position to a second operating position as the beam swings through its range, said second operating position corresponding to the beam's "full" load balance point;
- and means for swinging said arm from said second operating position to said first operating position when the material is removed from said weight-receiving means, said swinging means including a crank swingably mounted on said support, a spring having one end coupled with one leg of the crank, means coupling the other end of the spring with said arm, and means engaging the other leg of said crank for adjusting the position thereof and thereby varying the biasing force of said spring.

References Cited
UNITED STATES PATENTS

| | | | |
|---|---|---|---|
| 1,059,005 | 4/1913 | Schaffer | 177—60 X |
| 2,390,887 | 4/1946 | Drinnon | 177—72 |
| 2,442,907 | 6/1948 | Siler | 177—72 |
| 2,564,544 | 8/1951 | Richardson | 177—72 |

RICHARD B. WILKINSON, *Primary Examiner.*

G. H. MILLER, JR., *Examiner.*